May 23, 1944.  C. V. RUPIN  2,349,465
METHOD OF AND APPARATUS FOR SLICING MEAT
Filed Sept. 11, 1941
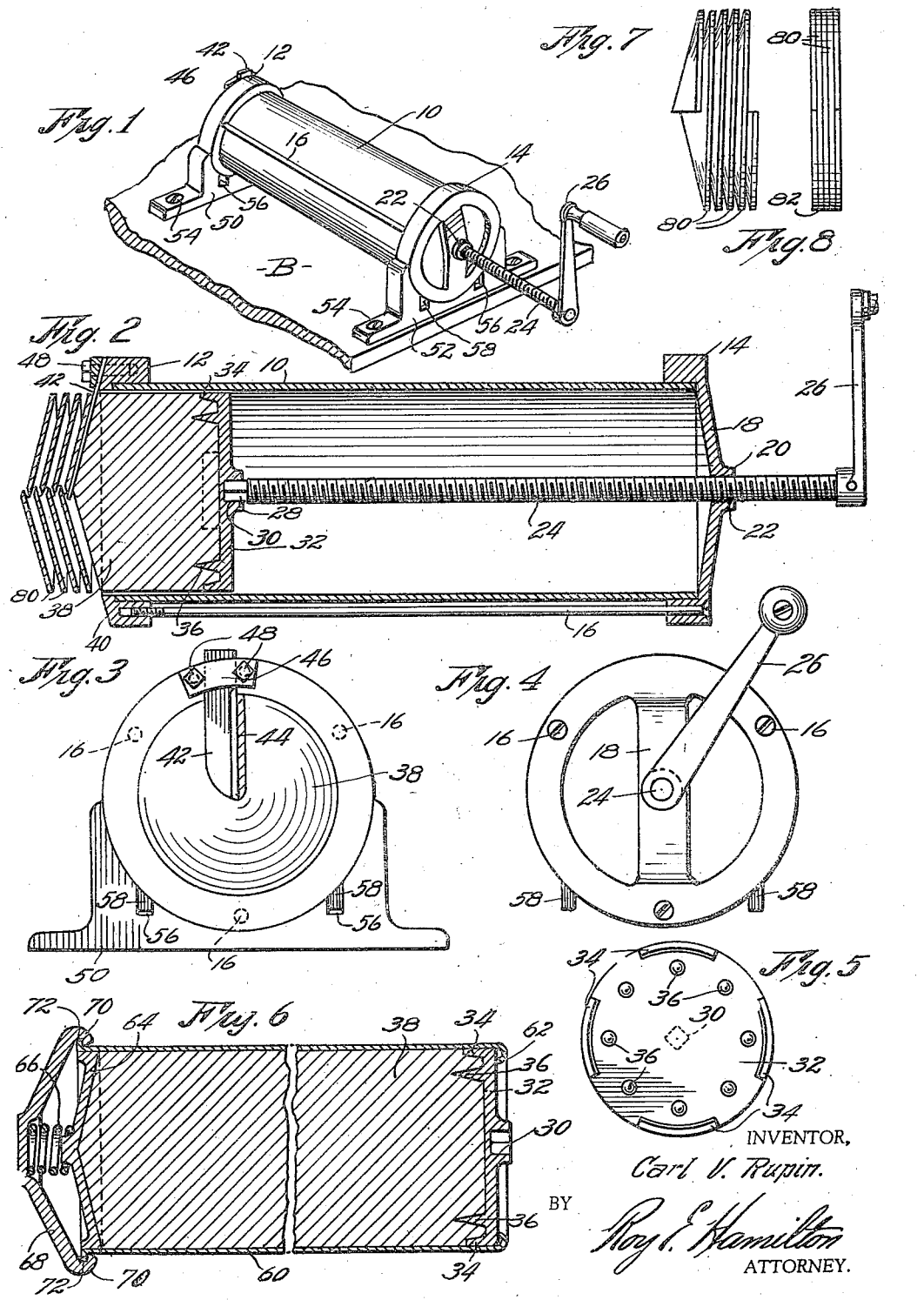
INVENTOR,
Carl V. Rupin.
BY
Roy E. Hamilton
ATTORNEY.

Patented May 23, 1944

2,349,465

UNITED STATES PATENT OFFICE 2,349,465

METHOD OF AND APPARATUS FOR SLICING MEAT

Carl V. Rupin, Topeka, Kans.

Application September 11, 1941, Serial No. 410,412

11 Claims. (Cl. 146—164)

This invention relates to improvements in the method of and apparatus for slicing meat, and more particularly to the slicing of meat while in the frozen state.

The principal object of the present invention is the provision of an apparatus operable to receive, rotate, and feed a stick of frozen meat to a radially disposed knife whereby a continuous helical slice of uniform thickness is produced.

Another object of the invention is the provision of an apparatus of the class described wherein the radially disposed knife is inclined outwardly from the tubular supporting member whereby the outer end of the meat stick is maintained in substantially conical shape during the cutting operation.

Another object is the method of slicing frozen meat in a continuous helical slice of uniform thickness including forming an elongated body of meat with an end plate partially embedded therein, freezing said meat, then rotating said body of meat to produce a helical slice of meat of substanitally uniform thickness.

Other objects are simplicity of construction and ease of operation, and adaptability for use with the various types of boneless meat.

With these as well as other objects which will appear during the course of the specification, in view, reference will now be had to the drawing wherein:

Figure 1 is a perspective view of an apparatus by means of which the slicing of frozen meat is carried out, embodying this invention.

Fig. 2 is an enlarged central sectional view of the apparatus, partly broken away.

Fig. 3 is an enlarged outer end view of the apparatus.

Rig. 4 is an enlarged inner end view of the apparatus.

Fig. 5 is a face view of the end plate.

Fig. 6 is a foreshortened longitudinal sectional view of a chamber in which the meat is frozen.

Fig. 7 is a side elevation of a series of convolutions of the helical slice of frozen meat; and Fig. 8 is an elevation of said series of convolutions pressed together to form a slice of meat for cooking.

Throughout the several views like reference characters refer to similar parts and the numeral 10 designates a tubular member of any suitable length, having annular end rings 12 and 14 held in fixed position on member 10 by means of threaded tie rods 16. The rear end ring 14 is provided with a diametrically disposed bar 18 having an axially positioned boss 20, which is bored and threaded at 22 to receive the feed screw 24. The outer end of feed screw 24 is provided with hand operable crank 26, but might be power driven if desired. The end of feed screw 24 is squared at 28 to operatively engage the squared recess 30 formed in the outer face of follow plate 32 which is slidably mounted in tubular member 10. The inner face of follow plate 32 is provided with spaced apart segmental, ring flanges 34, and inwardly projecting spikes 36 which serve to engage in the body of the meat 38 so that when the meat is thoroughly frozen the flanges and spikes will be in engagement with the meat, whereby the body of the meat may be rotated by the plate as hereinafter described.

The outer flanges 34 also function to hold the plate 32 against tilting during the cutting operation.

The front end ring 12 has a frusto-conical outer face 40, on which is supported a knife blade 42, which is outwardly inclined with its cutting edge 44 disposed on a line substantially radial to the feed screw 24. A clamp plate 46 rests on the outer end of knife 42 and is clamped thereagainst by means of machine screws 48. It will be noted that the knife extends just slightly past the center of the tubular member 10 thus insuring a full cut of the meat as the meat is rotated and fed forwardly by the helical screw feed 24. The form of the outer end of the frozen piece of meat as it is being sliced is substantially conical as shown in Fig. 2.

The apparatus is adapted to be supported in an operative position on a bench B in brackets 50 and bolts 54. Brackets 50 and 52 are slotted at 56 to receive the depending studs 58 formed integral with rings 12 and 14 respectively. When so positioned the body of the apparatus will be securely held in a stationary position during the slicing operation, and can be easily removed from the brackets and placed in suitable refrigerating compartments, thus eliminating to a minimum the raise of temperature of the frozen meat.

The container in which the meat is packed and frozen is shown in section in Fig. 6. The housing 60 is substantially the same shape as tubular member 10, but is slightly smaller in diameter. One end of housing 60 is provided with an inturned flange 62 against which the follow plate 32 rests. Meat 38 is cut into small pieces and pressed into the housing to snugly fit about flanges 34 and spikes 36. Concave disc member 64 is then slidably mounted in housing 60 and held in position by means of compression spring 66 which rests against the securing bracket 68 having hooked ends 70 which engage the outturned flange 72 on the outer end of the housing 60. During the freezing there will be a slight expansion of the meat which will cause an outward movement of disc member 64 and further compression of spring 66. After the meat is rigidly frozen the disc 64, bracket 68 and spring 66 are removed and the block of frozen meat with the follow plate 32 are removed from the housing 60 for depositing in the tubular member 10 of the slicing apparatus. It has been found necessary to heat the walls of 60 to slightly melt the meat, thereagainst, to relieve the adhesion before it can be conveniently removed from the housing. After the meat is removed from the housing 60 it is subjected to a freezing temperature so as to harden its outer surface.

The method of preparing and slicing frozen meat carried out by the use of the above described apparatus is substantially as follows:

The meat to be used may be beef, pork, mutton, etc. It should be boneless meat cut up into small pieces and packed into housing 60 about follow plate 32 and then frozen solid at any suitable freezing temperature. The housing 60 is then heated by immersing in hot water, or otherwise to release the meat from the housing then removing the stick or bar of frozen meat from the housing. The meat bar is again subjected to a freezing temperature to freeze its outer surface. The bar of meat is now placed in the tubular member 10 with the embedded plate 32 adjacent the feed screw end 20 so that the squared portion 28 of screw 24 will operatively engage the square socket 30. The outer end of the meat bar is conical in shape, to conform to the position of knife 42 so that there will be no loss of meat by irregular cutting. The operator now rotates crank 26 to operate feed screw 24 thereby rotating the meat bar against the cutting edge of knife, and at the same time moving the meat bar toward said knife at relative uniform rate of speed whereby uniform convolutions 80 of meat will be severed from the body of the meat. The slice of meat will be continuous and uniform thickness. Any number of convolutions of the meat slice can be segregated as shown in Fig. 7 and then pressed together to form a composite slice 82 suitable for use. The convolutions of the sliced meat are substantially helical in form with the general conical shape due to the position of the cutting knife relative to the axis of rotation of the meat bar above described. After the meat is once frozen it is maintained in the solid state during the slicing operation. Due to the particular structure of the slicing device it is possible to slice the meat without thawing or tempering it, thereby eliminating to a large extent the objectional changing of temperatures, which not only requires considerable time and expense but also is detrimental to the texture of the meat.

Very satisfactory results have been obtained by slicing the meat while it is solid and below 25° F. more uniform cut can be made and the fiber of the meat will not be torn apart.

A predetermined number of convolutions of the meat may be severed from the slice and pressed together to form a pad or slice of meat suitable for use. It is apparent that the meat might be stationary and the knife revolved to produce the same general result.

Many changes might be made in the apparatus and the method of preparing and slicing of the frozen meat without departing from the spirit of this invention.

What is desired to be secured by Letters Patent is:

1. The method of preparing and slicing meat comprising preforming an elongated body of meat, freezing said meat, rotating and uniformly feeding said meat to a knife radially disposed to the axis of rotation of said body of meat to form a helical slice of substantially uniform thickness.

2. The method of preparing and slicing frozen meat comprising forming an elongated body of meat with an end plate member partially embedded therein, freezing said meat, rotating and uniformly feeding said meat to a radially disposed knife whereby a continuous helical slice of uniform thickness is cut from the body of said frozen elongated body of meat.

3. The method of preparing and slicing meat comprising forming a cylindrical body of meat with a plate member partially embedded therein and subjecting said meat to freezing temperature until it is frozen solid, placing said frozen meat and plate in a container having a substantially radially disposed blade at its one end engaging and moving said plate and body of frozen meat in a helical path to said blade, whereby said frozen meat is sliced to form a continuous ribbon.

4. The method of preparing and slicing meat comprising forming a cylindrical body of meat with a plate member partially embedded therein and subjecting the meat to freezing temperature until it is frozen solid with the plate member rigidly anchored therein, placing said frozen meat and plate in a container carrying a blade at its one end with the cutting edge thereof inclined outwardly to intersect the axis of the body of meat at an acute angle engaging and moving said plate and body of frozen meat in a helical path to said blade, whereby said frozen meat is continuously sliced to form a series of like superimposed convolutions.

5. The method of preparing and slicing meat comprising an elongated body of meat freezing said meat until it is solid throughout moving said elongated body of frozen meat in a helical path to a stationary knife disposed substantially radially and at an acute angle to the axis of rotation of said body of meat, whereby a continuous helical slice of uniform thickness is cut from said body of frozen meat.

6. The method of preparing and slicing meat comprising an elongated body of meat freezing said meat until it is solid throughout moving said elongated body of frozen meat in a helical path to a stationary knife disposed substantially radially to the axis of rotation of said body of meat, whereby a continuous helical slice of uniform thickness is cut from said body of frozen meat then serving a predetermined number of convolutions from said helical slice and pressing them together to form a flat slab of meat.

7. A device of the character described a cylindrical tubular member having a fully open end a radially disposed blade carried by said tubular member at its open end and secured at its outer end radially beyond said open end, a screw feed rod operatively mounted in a threaded bracket rigid with the other end of said tubular member, and a follow-up plate having an irregular outer face operatively carried by said feed rod to rotate and move in a uniform helical path toward said blade as the feed rod is rotated.

8. A device of the character described a cylindrical tubular member having an open end, a blade carried in an outwardly inclined and radially disposed position relative to the open end of said tubular member, a screw feed rod operatively mounted in a threaded bracket carried by the other end of said tube, and a follow-up plate operatively engaged by said feed rod whereby when said feed rod is rotated a bar of frozen meat mounted in said tubular member on said follow-up plate will be fed to said blade and uniformly sliced in a continuous helical strip.

9. A device of the character described comprising a frame member a rotatably mounted positive screw feed member carried by said frame at its one end, and a blade carried by the other end portion of said frame with its cutting edge disposed in a plane including the axis of said screw feed member and at an acute angle to said axis.

10. A device of the character described comprising an elongated tubular member, a blade secured to said tubular member radially beyond the inner wall of said tubular member and disposed substantially radially only partially across the outer end of said tubular member, an axially threaded fixed boss rigidly carried at the other end of said tubular member, and a screw feed bar operatively engaging said threaded boss and engaging a follow-up disc whereby said disc is positively rotated and moved outwardly at a predetermined rate of speed as said screw feed bar is rotated.

11. A device of the character described comprising a fully open end tubular member, a radially disposed blade carried by said tubular member at its open front end and secured at its outer end radially beyond the inner wall of said tubular member, a screw feed bar axially mounted in a threaded boss fixed to the other end of said tubular member, and a follow-up disc mounted on said feed bar for rotation and forward movement therewith as the feed bar is rotated, said rotary and forward movement of said disc being always in proportion to the rate of rotations of said screw feed bar.

CARL V. RUPIN.